United States Patent [19]

Merkle

[11] 4,193,629
[45] Mar. 18, 1980

[54] TRUCK WITH DRIVER CAB

[75] Inventor: Josef Merkle, Esslingen, Fed. Rep. of Germany

[73] Assignee: Daimler-Benz Aktiengesellschaft, Fed. Rep. of Germany

[21] Appl. No.: 897,693

[22] Filed: Apr. 19, 1978

[30] Foreign Application Priority Data

Apr. 21, 1977 [DE] Fed. Rep. of Germany ....... 2717661

[51] Int. Cl.² ..................... B62D 25/00; B62D 35/00
[52] U.S. Cl. ..................... 296/190; 296/1 S
[58] Field of Search ............. 296/28 C, 35 R, 1 S, 296/190; 180/64 A, 89.12, 54 A

[56] References Cited

U.S. PATENT DOCUMENTS

| | | | |
|---|---|---|---|
| 1,781,380 | 11/1930 | Garfield | 296/35 R |
| 2,101,793 | 12/1937 | Field | 296/1 S |
| 2,135,906 | 11/1938 | Merry | 296/28 C |
| 3,612,599 | 10/1971 | Sternberg | 296/28 C |
| 3,711,146 | 1/1973 | Madzsar | 296/1 S |
| 3,907,057 | 9/1975 | Reddekopp | 180/64 A |
| 3,958,659 | 5/1976 | Selman | 296/28 C |

*Primary Examiner*—Philip Goodman
*Attorney, Agent, or Firm*—Craig and Antonelli

[57] ABSTRACT

A truck with a driver cab that includes two separate structural units, of which one is equipped as independently spring-supported operating cell essentially only with seating elements or seating and berthing elements as well as with control and operating elements while the other unit forms as covering and/or support unit a mounting unit for the operating cell and shields the operating cell on the rear side or on the rear and bottom side thereof.

30 Claims, 5 Drawing Figures

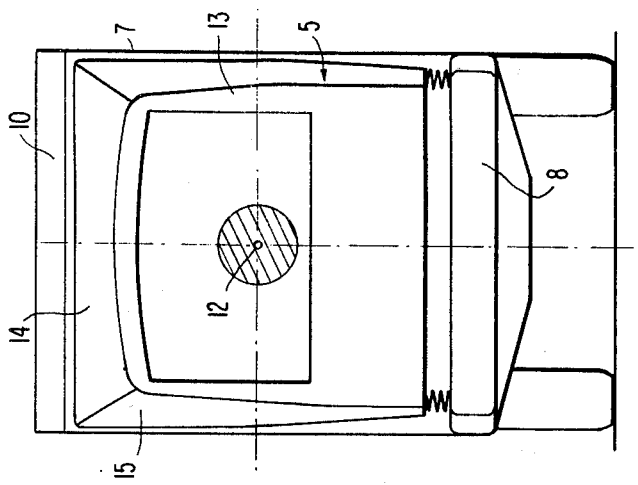
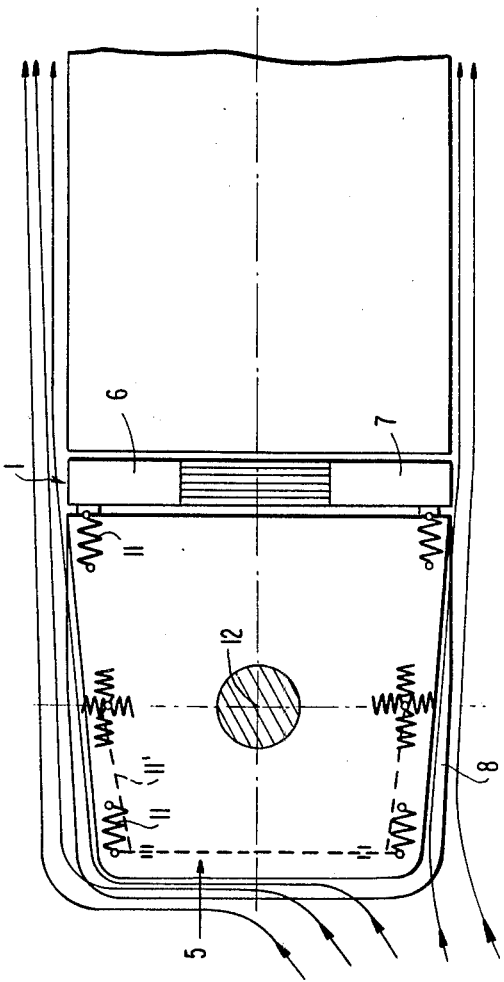
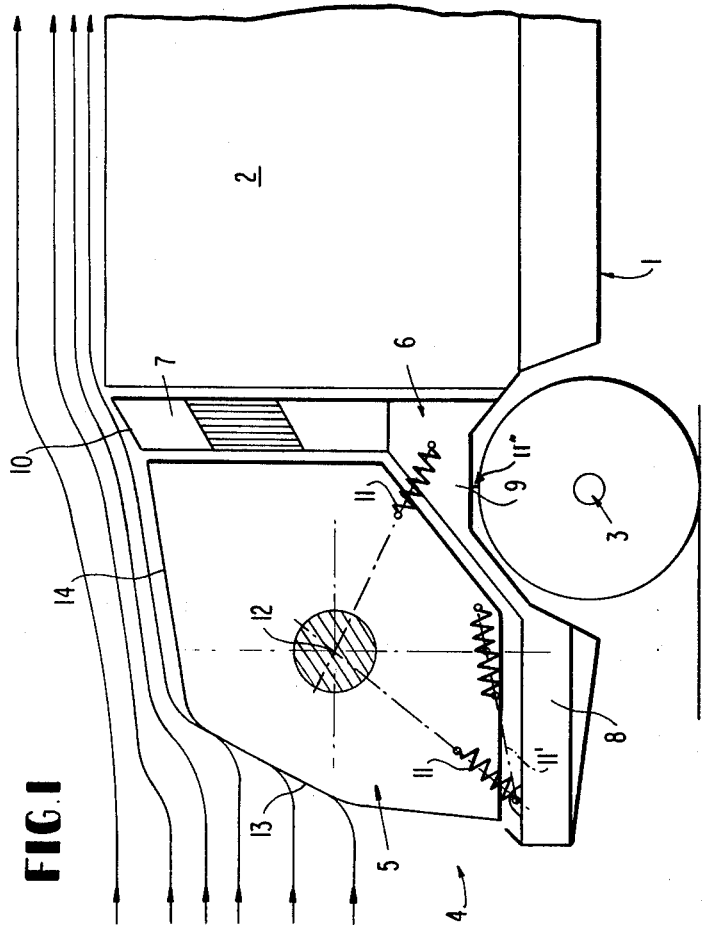

TRUCK WITH DRIVER CAB

The present invention relates to a truck with a driver cab which with an at least partial spring support includes in addition to control and operating elements at least one seat.

In the known trucks of older type of construction, the driver cab is rigidly connected with the vehicle frame. In the course of the development, especially for the comfort improvement, trucks with at least partly spring-supported driver cabs were developed. Among them are to be counted also those trucks with tiltable driver cabs, in which the driver cabs are pivotally connected with the frame at the front side and are springily supported on the rear side. Irrespective of whether the driver cabs were rigidly connected with the respective vehicle frame or were supported partly or altogether springily with respect to the vehicle frame, the driver cabs were used not only as operating cell, but at the same time as bearer or support element for diverse accessories. Among them are, inter alia, air-conditioning installations, air-deflectors (spoilers), wheel-casing coverings. In addition thereto, the driver cabs were used also as support elements for diverse engine accessories, such as exhaust lines and the like. The consequence of such arrangments is that notwithstanding an at least partial springy support of the driver cab, the spring comfort thereof is not satisfactory, especially as very unfavorable streamlining conditions occur by reason of the base form of the driver cab which for the most part is relatively bulky and unfavorable from a streamlining point of view, by reason of the additional structures attached thereto and mounted thereon and especially also by reason of the frequently existing spacing to the truck body, which, especially with the presently driven high velocities have as a consequence continuous vibrations of the driver cab, which can be counteracted only limitedly by a damped support of the driver cab. Moreover, these unfavorable streamlining conditions also lead to increased fuel consumptions, as is known.

A truck-driver-cab construction is to be provided by the present invention which entails by its basic conception all prerequisites for a particularly high driver cab comfort and by means of which at the same time also the aforementioned disadvantages can be essentially eliminated.

According to the present invention, this is attained with a truck having a driver cab of the aforementioned type, in that the driver cab includes two separate structural units, of which one as independently spring-supported operating cell is equipped essentially only with the control and operating elements as well as with seat or seat and berthing elements and the other unit as covering- and/or support unit forms a mounting means for the operating cell and shields the same on the rear side or on the rear side and bottom side. With such a construction, the operating cell can be designed and constructed optimally with respect to driving comfort, streamlining and also passenger safety since the other unit as covering- and support unit is able to assume essentially all those functions which have nothing to do with operating unit as such, but which in relation to the space conditions in the entire vehicle are appropriately or necessarily coordinated to the driver cab.

Thus, the part of the mounting unit forming the rear covering or shielding means may include a portion projecting upwardly beyond the driver cab approximately to the height of the truck body, which serves as wind deflector (spoiler) or a corresponding spoiler can be separately mounted on this unit. In both cases, the operating cell, properly speaking, remains uninfluenced by the forces acting on the spoiler, quite apart from the fact that also the corresponding mass forces need not be absorbed by way of the operating cell. Simultaneously therewith, the part of the mounting unit forming the rear covering or shielding means of the operating cell may be constructed as a bridging element between the operating cell and the truck body so that with a corresponding matching, an essentially continuous surface is attainable at least over the sides of the vehicle. This is also true for tractors of semi-trailer units if the bridging element, as viewed in plan view, has a concave curvature facing the truck body whereby the center of the curvature, i.e., the center of the radius of curvature, again viewed in plan view, coincides appropriately with the point of the fifth wheel. In order to take into consideration the additional space requirement, which results from a pivoting of the truck body with respect to the tractor about a cross axis through the fifth wheel point (bent tractor trailer unit), the bridging element can be constructed at least partially elastically and, for example, may be provided with aprons which extend in the direction toward the truck body so that also in this case essentially uninterrupted or continuous side surfaces are attainable. As to the rest, however, a covering of the operating cell toward the rear thereof is assured, in every case by the rear covering or shielding means, with the consequence that, for example, in case of a semi-trailer tractor unit the forces conditioned by eddying or vortexing actions occurring possibly between the briding element and the truck body, cannot act directly on the operating cell.

Feed and exhaust installations are appropriately built into or integrated with the bridging element so that not only an advantageous and appropriate accommodation exists for these parts but also the operating cell is no longer affected by these parts. In particular, good possibilities for a noise damping exist with such an arrangement.

The mounting unit includes within the scope of the present invention appropriately also the wheel case coverings, whereby the latter may be provided adjoining the rear shielding means and may be coordinated both to the rear as also to the bottom shielding means which, within the scope of the present invention, may be constructed separately and may be secured independently of one another with respect to the vehicle frame. Regardless of which of the parts to which the wheel casing coverings are coordinated, or whether the same are possibly also arranged fixed with the frame, the operating cell is no longer loaded by the same. Moreover, especially also boarding assists may be coordinated to the wheel casing coverings without impairment of the operating cell.

According to a further feature of the present invention, the bottom part of the mounting unit is preferably extended forwardly and/or also laterally in the contour beyond the operating cell and forms thereby initially an impact protection which simultaneously also reduces the soiling of the operating cell by reason of its contour projecting in plan view preferably continuously beyond the operating cell. Especially with wheel casings integrated into the bottom part of the mounting unit, the wheel casings are also drawn slightly beyond the side contour of the operating cell, as viewed in plan view, so that the aimed-at protection results over the entire length thereof.

The bottom part of the mounting unit within the scope of the present invention may be constructed fixed at the frame. However, an elastic support has proved as particularly appropriate, whereby the bottom part with a corresponding construction of this elastic support may also assume at the same time the bumper function so that a good all-around protection can be achieved for the operating cell by way of the bottom part.

Simultaneously therewith, the air resistance coefficient of the overall vehicle can be improved by a spoiler-like construction of this bottom part within its front and possibly also within its side areas.

In particular when the mounting unit is elastically supported at least with its bottom part with respect to the vehicle frame, a particularly high driving comfort can be realized for the operating cell since within the scope of the present invention the latter is also springly supported, in its turn, with respect to the mounting unit. This elastic support may, however, be kept comparatively soft since with the solution according to the present invention no parts are coordinated any longer to the operating cell which load the same unnecessarily from a mass point of view or through which additional unfavorable loads are exerted on the operating cell as a result of wind forces or aerodynamic forces.

The support of the operating cell which is preferably as soft as possible for comfort reasons is appropriate in particular in conjunction with a contour of the operating cell, in which the resultant of the air forces acting on the operating cell engage approximately in the center of gravity of the cell and is directed obliquely rearwardy and downwardly so that the operating cell with increasing air forces and thus especially at high velocities is forced into its springy support and is stabilized thereby. Especially in conjunction with an elastic support of the mounting unit with respect to the vehicle frame, a construction is thereby particularly appropriate in which the operating cell with increasing wind forces is finally seated at least nearly in the mounting unit.

With a view to the aforementioned requirements, it is appropriate for the operating cell if the same extends at the front end obliquely upwardly and rearwardly whereby the front side is constructed possibly bent and the inclined position thereof is larger in its upper area including the windshield pane. A configuration is appropriate for the roof portion of the operating cell, in which the same rises obliquely rearwardly and upwardly. Appropriately, the roof portion thereby adjoins continuously the bridging element so that especially in conjunction with the construction of the bridging element as spoiler or in conjunction with a spoiler mounted on the bridging element, an undisturbed flow over the entire vehicle results therefrom.

Accordingly, it is an object of the present invention to provide a truck with a driver cab which avoids by extremely simple means the aforementioned shortcomings and drawbacks encountered in the prior art.

Another object of the present invention resides in a truck with a driver cab which greatly improves the driving comfort.

A further object of the present invention resides in a truck with a driver cab in which not only the driving comfort is significantly increased but also extraordinarily favorable streamlining conditions are assured.

Still a further object of the present invention resides in a driver cab construction for trucks in which the driver cab is far-reachingly protected against vibrations.

Still another object of the present invention resides in a truck with a driver cab which assures favorable fuel consumption as a result of favorable streamlining.

Another object of the present invention resides in a truck with a driver cab in which a feel for a substantial safety is assured to the driver, especially at high driving velocities.

These and other objects, features and advantages of the present invention will become more apparent from the following description when taken in conjunction with the accompanying drawing which shows, for purposes of illustration only, two embodiments in accordance with the present invention, and wherein:

FIG. 1 is a schematic side elevational view of the front part of a truck with a box-like truck body in accordance with the present invention;

FIG. 2 is a schematic top plan view on the front part of the truck of FIG. 1;

FIG. 3 is a schematic front elevational view of the truck of FIGS. 1 and 2;

Figure 4:
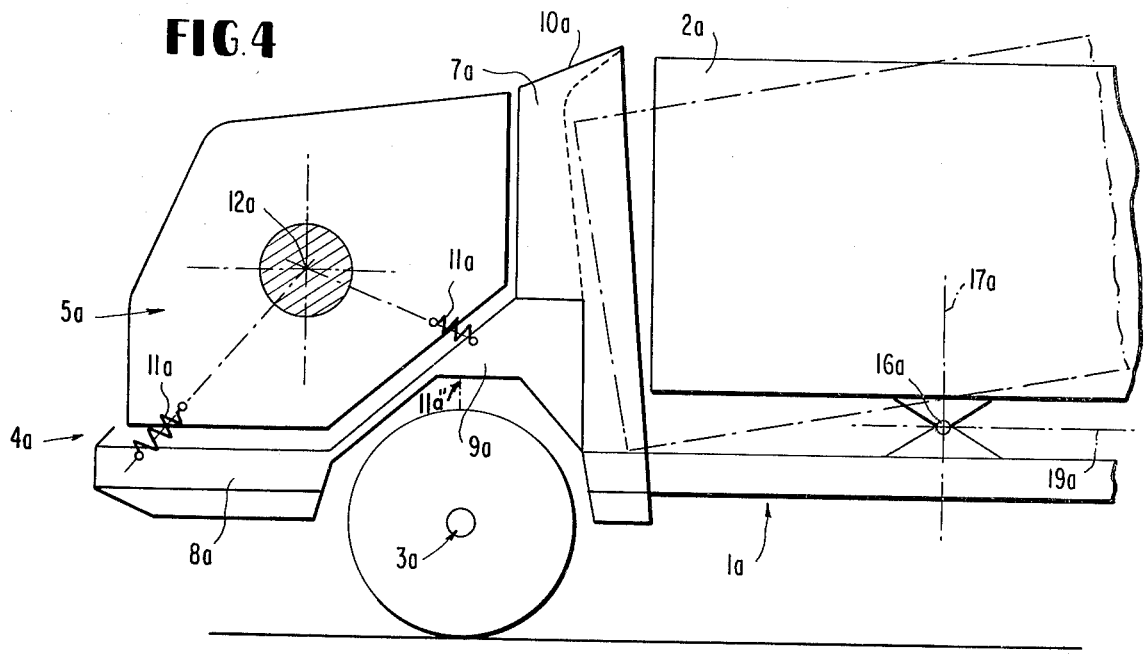
FIG. 4 is a schematic side elevational view of a modified embodiment of a truck with a box-like truck body in accordance with the present invention, whereby a tractor with attached truck body of a tractor-trailer unit is now indicated as vehicle.

Referring now to the drawing wherein like reference numerals are used throughout the various views to designate like parts, in the embodiment according to FIGS. 1 to 3, reference numeral 1 generally designated therein a truck illustrated therein only in part, which includes a fixed but possibly interchangeable box-shaped truck body 2 and in which a driver cab generally designated by reference numeral 4 is arranged within the area above the front axle 3.

The driver cab 4 includes two separate structural units, and more particularly, on the one hand, the operating cell generally designated by reference numeral 5 to which are coordinated only control and operating elements as well as seating elements or seating and berthing elements (not shown in detail). A mounting unit generally designated by reference numeral 6 is coordinated to the operating cell 5 as second unit of the driver cab, which in the illustrated embodiment includes a rear shielding means 7 and a bottom shielding means 8.

The mounting unit 6 may altogether be elastically supported with respect to the frame of the vehicle in any conventional manner not illustrated in detail herein. However, it may also be fixedly arranged at least in part with respect to the frame, particularly in a sound-insulating manner, or may be formed by parts of the frame itself. This is true in particular for the bottom shielding means 8. However, an elastic support at least of the bottom shielding means 8 with respect to the frame is preferably provided, whereby the bottom shielding means 8 is formed in its rear portion preferably by wheel casing coverings 9. The front portion of the bottom shielding means 8 may appropriately be constructed as a type of front spoiler, whereby this front spoiler may be integrated into the shielding means 8 itself and the shielding means 8 may altogether form a bumper-like unit in its forward portion.

On the rear side, a bridging element adjoins the bottom shielding means 8 as rear shielding means 7 located directly in front of the truck body 2, which fills the intermediate space between the operating cell 5 and the truck body 2 and which forms a matching member, by means of which a transition between the operating cell 5 and the truck body 2 is established which is as favorable as possible from a streamlining point of view. The bottom shielding means 8 also acts in a similar manner, which, as illustrated in particular by FIGS. 2 and 3, passes over with its outer contour also areally into the outer contour of the truck body 2.

The rear shielding means 7 which within the scope of the present invention may also be constructed with the bottom shielding means 8 as one unit, forms in the illustrated embodiment a spoiler 10 with its upper end. In lieu of the integration of the spoiler 10 into the rear shielding means 7, as shown in the drawing, of course, also a separate spoiler may be mounted thereon within the scope of the present invention. This separate spoiler will then also be mounted on the rear shielding means 7 so that the operating cell 5 is not actuated either by air- or mass-forces in relation to this spoiler.

Feed and exhaust installations may be built into or also integrated with the rear shielding means 7 which is indicated herein only schematically, for example, air filters, exhaust pipes and the like. A space-saving and at the same time also noise-absorbing and therefore favorable arrangement is provided by the shielding means.

The operating cell 5 is elastically supported in the mounting unit 6, whereby the support takes place by way of the springs 11 of any conventional type in such a manner that the resultant of the spring forces extends approximately through the center of gravity 12 of the operating cell 5, whereby the guide members 11' also of any conventional construction take over the longitudinal and cross guidance of the operating cell 5. Also the resultant of the aerodynamic forces (air forces) passes approximately through this center of gravity 12, which resultant is directed obliquely downwardly and rearwardly (not shown in the drawing), i.e., which is directed toward the transition area of rear and bottom shelding means 7 and 8 which in practice is formed in the illustrated embodiment by the wheel casing coverings 9.

Such a direction of action is achieved for the resultant of the aerodynamic forces, when these forces flow against the vehicle from in front or also obliquely from in front, in that the operating cell 5 includes a front wall 13 extending obliquely upwardly and toward the rear and a roof surface 14 extending obliquely rearwardly and upwardly which roof surface, as already mentioned, passes over essentially into the spoiler 10.

In conjunction with a comparatively soft spring support of the operating cell 5 which is possible by reason of the fact that the same, as already mentioned hereinabove, is kept far-reachingly free from other parts, this construction has as a consequence that the operating cell 5 is being forced into the mounting unit 6 against the support springs especially at higher velocities and accordingly at comparatively high air forces, with the consequence that notwithstanding the soft spring support of the operating cell with respect to the vehicle during normal operation and the high driving comfort conditioned thereby, a secure anchoring exists at high velocities which enables a safe vehicle driving and steering and a safe feel also for the vehicle. At the same time, a far-reachingly smooth flow about the operating cell 5 and about the truck body 2 is thereby assured by the construction of the mounting unit 6 in its rear and in its bottom part as shielding means 7 and 8, respectively, so that the operating cell 5 notwithstanding its soft support, cannot be set into vibration by air eddys or vortices as occur in solutions, in which a larger gap exists between the truck body and the driver cab.

The clearance or play necessary by the elastic spring support of the operating cell 5 does not lead in practice to a visible gap between the operating cell 5 and the bottom or rear shielding means 8 and 7 since corresponding aprons or a corresponding overlap can be provided between the parts.

The bottom shielding means 8 which preferably includes the wheel casings 9 may, as described, be supported in its turn elastically or springily with respect to the vehicle frame and may serve simultaneously as support for the springs 11 carrying the operating cell 5. Such a series-connection leads to a particularly good damping. The support of the bottom shielding means 8 with respect to the vehicle frame (schematically represented at 11") may take place preferably in such a manner that with a corresponding sturdy and stable construction of this shielding means, the same forms simultaneously a ramming protection or a bumper, into which the front spoiler is integrated. As a result thereof, the operating cell 5 is protected, which with a corresponding rigid construction may deflect during an impact possibly also in the direction toward the truck body 2 if the rear shielding means 7 is constructed correspondingly yieldingly, which is also within the scope of the present invention.

As can be seen in particular from FIG. 3, a face of the operating cell results which in front elevation tapers toward the front, and more particularly conditioned by the inclination of the side walls 15 of the operating cell 5 which extend forwardly obliquely toward one another and by the inclination of the roof surface 14. This impression is additionally enhanced by the spoiler-like construction of the bottom shielding means 8 so that in conjunction with the spoiler 10, as indicated in the figures, an essentially uniform flow over the entire vehicle can be attained.

Figure 5:
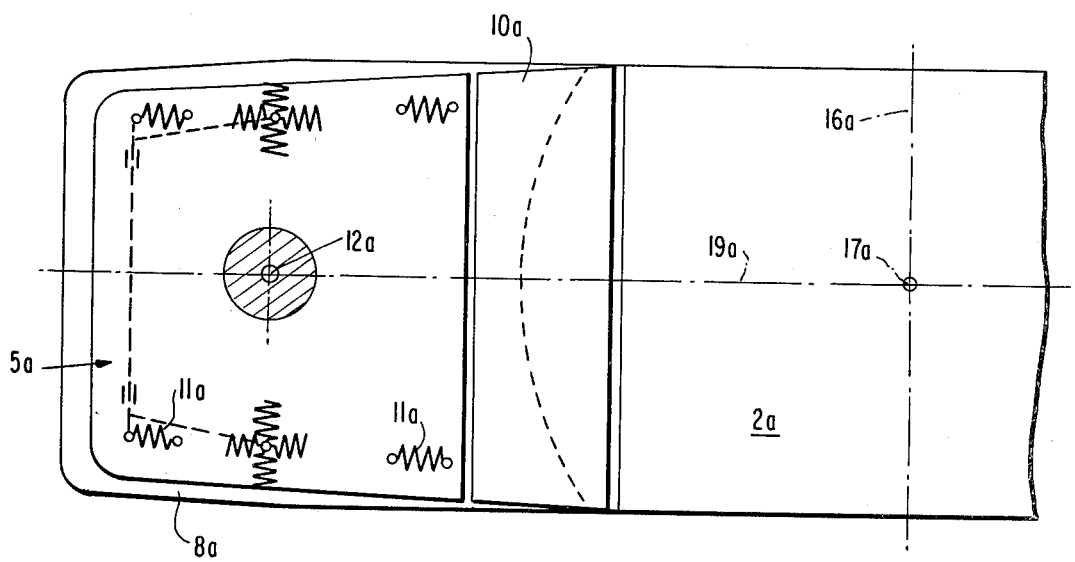
FIG. 5 is a schematic plan view on the truck of FIG. 4.

The embodiment according to FIGS. 4 and 5 in which corresponding parts are designated by corresponding reference numerals with the suffix a, differs from the embodiment of FIGS. 1 to 3 only insofar as a truck is illustrated in FIGS. 4 and 5, in which the truck body 2a is formed by a semi-trailer which is connected by way of kingpin 16a with the vehicle part including the driver cab 4a, namely, with a tractor.

As a result of the movability of the semi-trailer 2a with respect to the tractor, the necessity results to leave a free space between the driver cab 4a and the semi-trailer 2a which has to permit both rotary movements of the semi-trailer 2a about the vertical axis 17a of the kingpin 16a as also about axes perpendicular thereto, namely, about a cross axis 18a and a longitudinal axis 19a.

The required free space is assured in that the rear shielding means 7a is given a concavely curved contour, as viewed in plan view, on its side facing the truck body 2a, whereby the radius of curvature coincides in plan view approximately with the kingpin 16a. This bulging contour of the rear shielding means 7a which is illustrated in FIGS. 4 and 5 can be attained altogether by a corresponding configuration for the rear shielding means 7a.

However, it is also possible in addition thereto to coordinate aprons or the like to the rear shielding means 7a and to the part of the bottom shielding means 8a provided downwardly in extension thereof, which bridge the necesary free space to the truck body 2a constructed as semi-trailer. Also the spoiler 10a coordinated to the rear shielding means 7a at the top thereof may be constructed curved in a corresponding manner, as can be seen in plan view according to FIG. 5, so that notwithstanding the difficult conditions, as such, and notwithstanding the necessary free space between semi-trailer 2a and driver cab 4a, a far-reachingly closed outer surface can be realized which assures an undisturbed flow about the entire vehicle which is as favorable from a streamlining point of view as possible. In particular, these favorable streamlining conditions can be preserved in the construction according to the present invention also with side winds or the like by reason of the rear shielding means 7 and 7a as bridging element.

Since the construction according to FIGS. 4 and 5 essentially corresponds in its details to those according to FIGS. 1 to 3, a further description thereof is dispensed with herein and the individual corresponding parts are merely designated with corresponding reference numerals including the suffix a.

While I have shown and described only two embodiments in accordance with the present invention, it is understood that the same is not limited thereto but is susceptible of numerous changes and modifications as known to those skilled in the art, and I, therefore, do not wish to be limited to the details shown and described herein but intend to cover all such changes and modifications as are encompassed by the scope of the appended claims.

I claim:

1. In a truck of the type having a driver cab resiliently mounted upon a vehicle frame, said driver cab having an operator's compartment having at least one seat in addition to control and operating elements, the improvement wherein said driver cab resiliently mounted on said frame comprises an operating unit, containing essentially only said operator's compartment, and a receiving unit containing any driver's cab mounted auxiliary units in the nature of wind deflectors, engine accessories and the like, and wherein said operating unit is elastically suspended upon said receiving unit for independent movement relative thereto.

2. A truck according to claim 1, characterized in that the receiving unit shields the operating unit both on the rear and bottom side.

3. A truck according to claim 1 or 2, characterized in that said operating unit includes both seat and berthing means.

4. A truck according to claim 1 or 2, characterized in that said receiving unit is constructed in one part.

5. A truck according to claim 1 or 2, characterized in that the receiving unit is of a multi-partite construction.

6. A truck with a vehicle frame means, according to claim 1 or 2, characterized in that the receiving unit is at least partly yieldingly supported with respect to the vehicle frame means.

7. A truck according to claim 6, characterized in that the receiving unit is elastically supported in a sound-absorbing manner with respect to the frame means.

8. A truck according to claim 1 or 2, characterized in that the receiving unit is at least partly non-yieldingly supported.

9. A truck according to claim 2, characterized in that a part of the receiving unit that shields the operating unit on the rear is constructed as a bridging element forming a transition to the truck body.

10. A truck according to claim 9, characterized in that the bridging element carries a spoiler which extends above the driver cab and is matched to the height of the truck body.

11. A truck according to claim 9, characterized in that the bridging element is constructed in its upper area as a spoiler.

12. A truck according to claim 9, characterized in that the bridging element is constructed as covering shaft for at least one of feed and exhaust devices.

13. A truck according to claim 9, characterized in that at least lateral covering means are coordinated to the bridging element.

14. A truck according to claim 13, characterized in that the lateral covering means are constructed elastically.

15. A truck according to claim 13 or 14, characterized in that the lateral covering means are constructed as aprons.

16. A truck according to claim 9, characterized in that the mounting means includes wheel casing cover means.

17. A truck according to claim 16, characterized in that the wheel casing cover means are provided adjoining the bridging element.

18. A truck according to claim 16 or 17, characterized in that the wheel casing cover means belong to a part of the mounting means forming a bottom shielding means.

19. A truck according to claim 2, 10, or 11, characterized in that part of the receiving unit forms a bottom shielding means and includes on its front side a front spoiler.

20. A truck according to claim 16, characterized in that the wheel casing cover means are arranged in a transition area between the bridging element and front spoiler.

21. A truck according to claim 20, characterized in that the wheel casing cover means form an obliquely rearwardly and upwardly extending transition area of the receiving means.

22. A truck according to claim 1, 2 or 21, characterized in that the elastically supported operating unit is so constructed that the resultant of the air forces acting on the operating unit which engage at least approximately in the center of gravity are directed obliquely rearwardly and downwardly.

23. A truck according to claim 22, characterized in that the front end of the operating unit extends obliquely upwardly and rearwardly.

24. A truck according to claim 23, characterized in that the operating unit includes a top side forming a roof surface that extends obliquely rearwardly and upwardly.

25. A truck according to claim 24, characterized in that the roof surface of the operating unit adjoins approximately the bottom edge of the spoiler.

26. A truck according to claim 1, 10 or 11 characterized in that the front end of the operating cell extends obliquely upwardly and rearwardly.

27. A truck according to claim 26, characterized in that the operating unit includes a top side forming a roof surface that extends obliquely rearwardly and upwardly.

28. A truck according to claim 27, characterized in that the roof surface of the operating unit adjoins approximately the bottom edge of the spoiler.

29. A truck with a vehicle frame means, according to claim 28, characterized in that the receiving means is at least partly yieldingly supported with respect to the vehicle frame means.

30. A truck according to claim 29, characterized in that the receiving means is elastically supported in a sound-absorbing manner with respect to the frame means.

* * * * *